United States Patent
Trevillyan et al.

(10) Patent No.: US 6,199,906 B1
(45) Date of Patent: Mar. 13, 2001

(54) DUAL STAGE PYROTECHNIC INFLATOR

(75) Inventors: Dennis A. Trevillyan, Plant City; Jon A. Yencho; Donald E. Warren, both of Lakeland, all of FL (US)

(73) Assignee: Breed Automotive Technology, Inc., Lakeland, FL (US)

(*) Notice: Subject to any disclaimer, the term of this patent is extended or adjusted under 35 U.S.C. 154(b) by 0 days.

(21) Appl. No.: 09/373,396

(22) Filed: Aug. 12, 1999

(51) Int. Cl.⁷ .................................................. B60R 21/26
(52) U.S. Cl. ................................. 280/741; 280/736
(58) Field of Search ................................ 280/741, 742, 280/736, 737

(56) References Cited

U.S. PATENT DOCUMENTS

| | | | |
|---|---|---|---|
| 4,998,751 | 3/1991 | Paxton et al. | 280/741 |
| 5,221,109 * | 6/1993 | Marchant | 280/736 |
| 5,346,254 * | 9/1994 | Esterberg | 280/741 |
| 5,368,329 * | 11/1994 | Hock | 280/741 |
| 5,398,966 * | 3/1995 | Hock | 280/736 |
| 5,400,487 * | 3/1995 | Gioutsos et al. | 280/735 |
| 5,460,405 * | 10/1995 | Faigle | 280/735 |
| 5,513,879 | 5/1996 | Patel | 280/739 |
| 5,558,367 * | 9/1996 | Cuevas | 280/737 |
| 5,564,743 * | 10/1996 | Marchant | 280/741 |
| 5,582,428 * | 12/1996 | Buchanan et al. | 280/741 |
| 5,613,702 | 3/1997 | Goetz | 280/735 |
| 5,630,619 * | 5/1997 | Buchanan et al. | 280/741 |
| 5,709,406 * | 1/1998 | Buchanan | 280/737 |
| 5,762,368 * | 6/1998 | Faigle et al. | 280/737 |
| 5,803,494 * | 9/1998 | Headley | 280/741 |
| 5,839,754 | 11/1998 | Schluter et al. | 280/736 |
| 5,851,027 | 12/1998 | DiGiacomo | 280/736 |
| 5,992,881 * | 11/1999 | Faigle | 280/737 |
| 6,019,389 * | 2/2000 | Burgi et al. | 280/736 |
| 6,032,979 * | 3/2000 | Mossi et al. | 280/741 |
| 6,106,010 * | 8/2000 | Foirbes et al. | 280/741 |
| 6,129,381 * | 10/2000 | Katsuda et al. | 280/741 |
| 6,139,055 * | 10/2000 | Dahl et al. | 280/741 |

FOREIGN PATENT DOCUMENTS

11048905 * 2/1999 (JP).

* cited by examiner

Primary Examiner—J. J. Swann
Assistant Examiner—David R. Dunn
(74) Attorney, Agent, or Firm—Lonnie Drayer; Beth Vrioni

(57) ABSTRACT

A dual stage gas generator for inflating an airbag used in vehicle occupant restraint systems. Wherein the gas generator contains primary and secondary combustion chambers and a common gas exiting port for controlling the combustion pressure in both combustion chambers. Said gas generator when activated can cause an airbag to inflate at different rates dependent on the firing sequence used. The low output performance level occurs when only the primary stage is deployed. Simultaneous firing of both the primary and secondary stage constitutes the upper performance limits, while staging results from deployment of the primary stage and some time later deployment of the secondary stage. The staging provides a means to supply inflation gas in a variable rate fashion.

13 Claims, 2 Drawing Sheets

DUAL STAGE PYROTECHNIC INFLATOR

TECHNICAL FIELD

The present invention relates to gas generators or inflators, for inflating vehicle restraint cushions, commonly known as air bags. Air bags have been used for some time to provide impact protection to occupants of passenger vehicles. More particularly, this invention relates to an improved inflator that can provide varying rates of inflation of the air bag. The rate of air bag inflation can be controlled through the inventive inflator to adapt to various crash conditions and/or occupant positions.

BACKGROUND ART

The present invention relates to an apparatus used to stage the inflation of an airbag in a vehicle occupant restraint system. Inflation of an airbag through the use of gas generators is well known and understood. This invention, a dual stage pyrotechnic inflator (DSP), is a two-stage gas generator used to provide a variable gas output so that the rate of airbag inflation can be controlled. Controlling the rate of gas generation and thereby the rate of rise of pressure within the airbag provides better protection for a wider range of vehicle occupants while minimizing the risk of injury resulting from the airbag deployment. Currently, single stage inflators are designed to inflate rapidly in order to meet required United States Government injury criterion. With single stage inflators, smaller and out of position occupants are at risk of being injured during the airbag deployment. The use of a staged output inflator coupled to the appropriate sensing device reduces the likelihood of injury to the vehicle occupant.

The primary objective of this invention is to supply gas used to fill an airbag in either a single stage or multistage manner. This is accomplished through the use of two combustion chambers in isolation, containing gas generant. Deployment modes may involve deployment of both stages at once or the primary followed by the secondary at some later time to provide the desired gas delivery event.

Controlled inflation of an airbag as taught by Cuevas et al. in U.S. Pat. No. 5,558,367 employs a hybrid inflator containing an inflating fluid and two igniters. The fluid is released by activation of the first igniter. A second igniter is used to ignite combustible material for the purpose of increasing the temperature and pressure of the contained fluid. Buchanan et al., U.S. Pat. Nos. 5,582,428, 5,630,619, and 5,709,406, describe the use of hybrid technology to address the staging problem. The invention describe herein is not a hybrid inflator.

Marchant in U.S. Pat. No. 5,221,109 incorporates into the gas generator, a venting mechanism used to control gas output. Esterberg in U.S. Pat. No. 5,346,254 describes a single combustion chamber inflator design, which employs dual output igniter. The first stage of the igniter provides the ignition impulse required to ignite the gas generant and some point in time later the second stage of the igniter is fired, cracking the gas generant thereby increasing the surface area available for combustion.

Hock in U.S. Pat. Nos. 5,368,329 and 5,398,966 discloses an elongated inflator housing, containing gas-generating wafers spaced along the length of the tube, containing two igniters. The primary igniter provides the ignition source required to ignite the gas generant and the second igniter is used to shatter the wafer when fired at a latter time. Shattering of the gas generant wafer increases burning surface area and thereby the mass generation rate of gas. The DSP does not employ generant shattering technology.

U.S. Pat. No. 5,564,743 to Marchant discloses a multiple stage air bag inflator system wherein the inflator housing contains two separated chambers, each containing gas generating material and an ignition system. The wall that separates the two chambers has a frangible section designed to rupture in response to a predetermined level of gas pressure in one of the chambers, thus providing fluid communication between the chambers.

Faigle et al. in U.S. Pat. No. 5,460,405 describes an apparatus containing a controller and a collision and position sensor for controlling the actuation of the first and second fluid source required to inflate the air bag.

Gioutos et al. in U.S. Pat. No. 5,400,487 discloses a system whereby multiple individual gas generators are used to generate the desired airbag inflation rate. No mention is made of the use of a single staged inflator. Schluter et al. in U.S. Pat. No. 5,839,754 describes a multichambered gas generator and a single ignition source used to ignite the gas generant in the primary chamber. The gas generant in the primary chamber serves as an ignition source for the gas generant housed in the secondary chamber by forcing hot burning gas through bores and into the secondary chambers.

OBJECTIVES AND SUMMARY OF THE INVENTION

The objective of the present invention is to provide variable output levels of inflation gas to an airbag used in a vehicle occupant restraint system. This is accomplished through the physical partitioning of a quantity of gas generating pellets into two chambers equipped with separate ignition systems, filters and a common exit port. Through the use of a variable output inflator, air bag performance tailorability can be achieved. The performance range stretches from low to high gas output levels. Staging is accomplished through the use of a gas generator with two separate levels of gas output. The two gas output levels are independent of each other and can be activated on demand. The combustion of the gas generant is conducted in such a manner to minimize the generation of noxious gasses.

A further objective is to provide a reliable inflator which can generate inflation gas quickly, efficiently, and with minimal noxious products.

An inflator constructed in accordance with this invention consists of a two-piece housing welded together. The internal volume of this housing is divided into two chambers using a third steel member to provide an annular space between the third member and the lower of the two main housings. A gas generating material, filters and ignition systems are placed in each of the two chambers. Other objectives and advantages of the invention shall become apparent from the following description of the invention and the accompanying drawings.

BRIEF DESCRIPTION OF THE DRAWINGS

Further features of the present invention will become apparent to those skilled in the art to which the present invention relates from reading the accompanying drawings, in which.

DETAILED DESCRIPTION OF THE INVENTION

Figure 1:
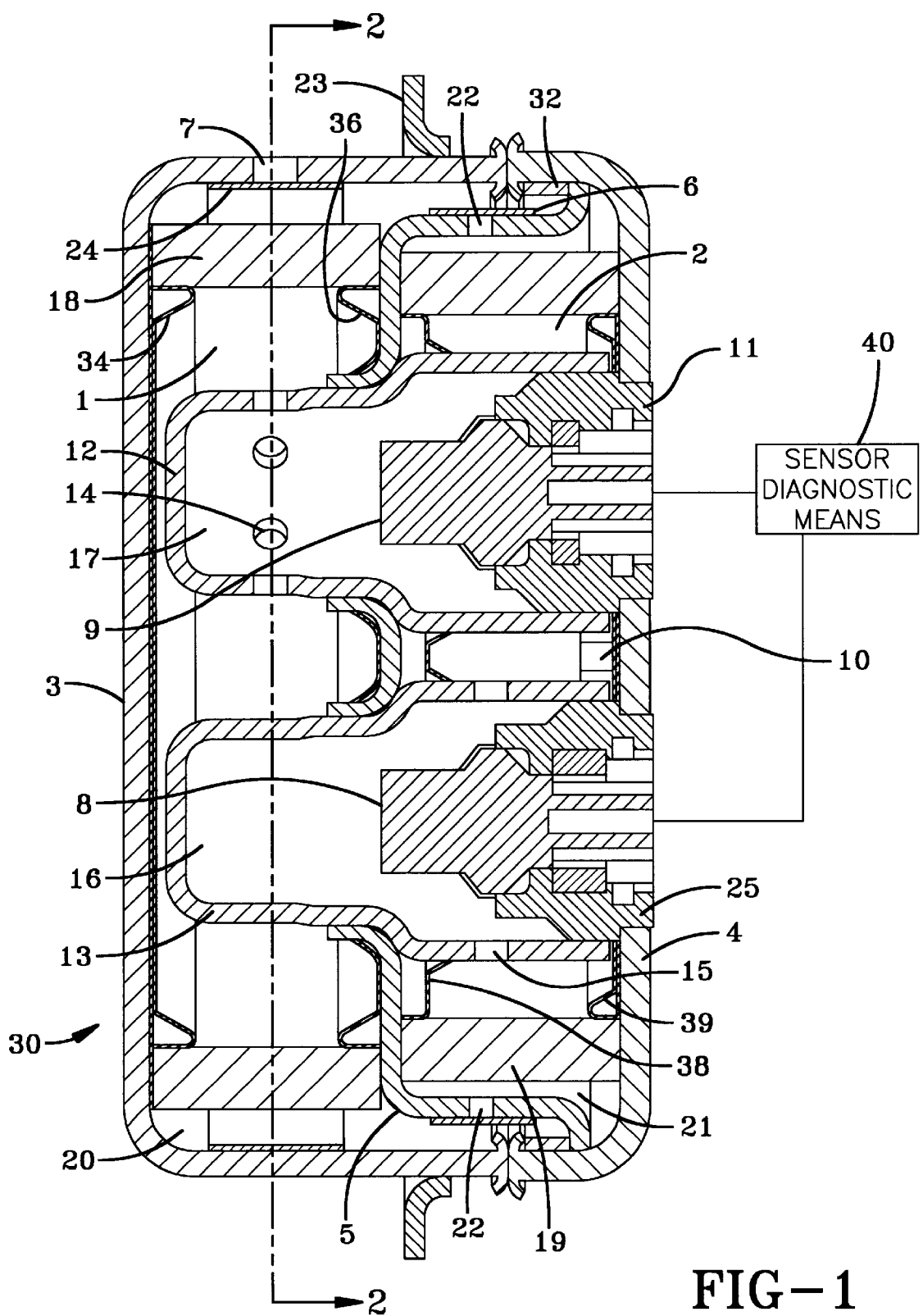
FIG. 1 shows a side cross-sectional view of an inflator constructed in accordance with the instant invention.

Referring to FIG. 1, an embodiment of an inflator constructed in accordance with this invention is generally designated by reference number 30. The inflator 30 has two discreet chambers: a primary combustion chamber 1 and a secondary combustion chamber 2. The primary stage gas generator deployment occurs when a first body of gas generating means (not shown for the purpose of clarity) housed in the primary combustion chamber 1 is ignited and gas is produced. Likewise, the secondary stage gas generator deployment occurs when a second body of gas generating means (not shown for purpose of clarity) in the secondary combustion chamber 2 is ignited and begins to produce gas. A plurality of primary gas exit ports 7 in the upper housing 3 control the pressure development in both the primary 1 and secondary 2 combustion chambers. In an event requiring a low output deployment only the gas generant housed in the primary combustion chamber 1 is ignited. When a high output deployment is required the gas generant in both the primary 1 and the secondary 2 combustion chambers will be ignited simultaneously. Staging at intermediate levels will involve ignition of the primary combustion chamber gas generant followed by ignition of the secondary combustion chamber gas generant at some point later in the event. Staging thereby controls rate of generation of inflating gases going into the airbag and thereby the inflation rates. In a preferred embodiment the primary chamber 1 contains from 50% to 80% of the total gas generant load, and the secondary chamber 2 contains from 20% to 50% of the total gas generant load.

Figure 2:
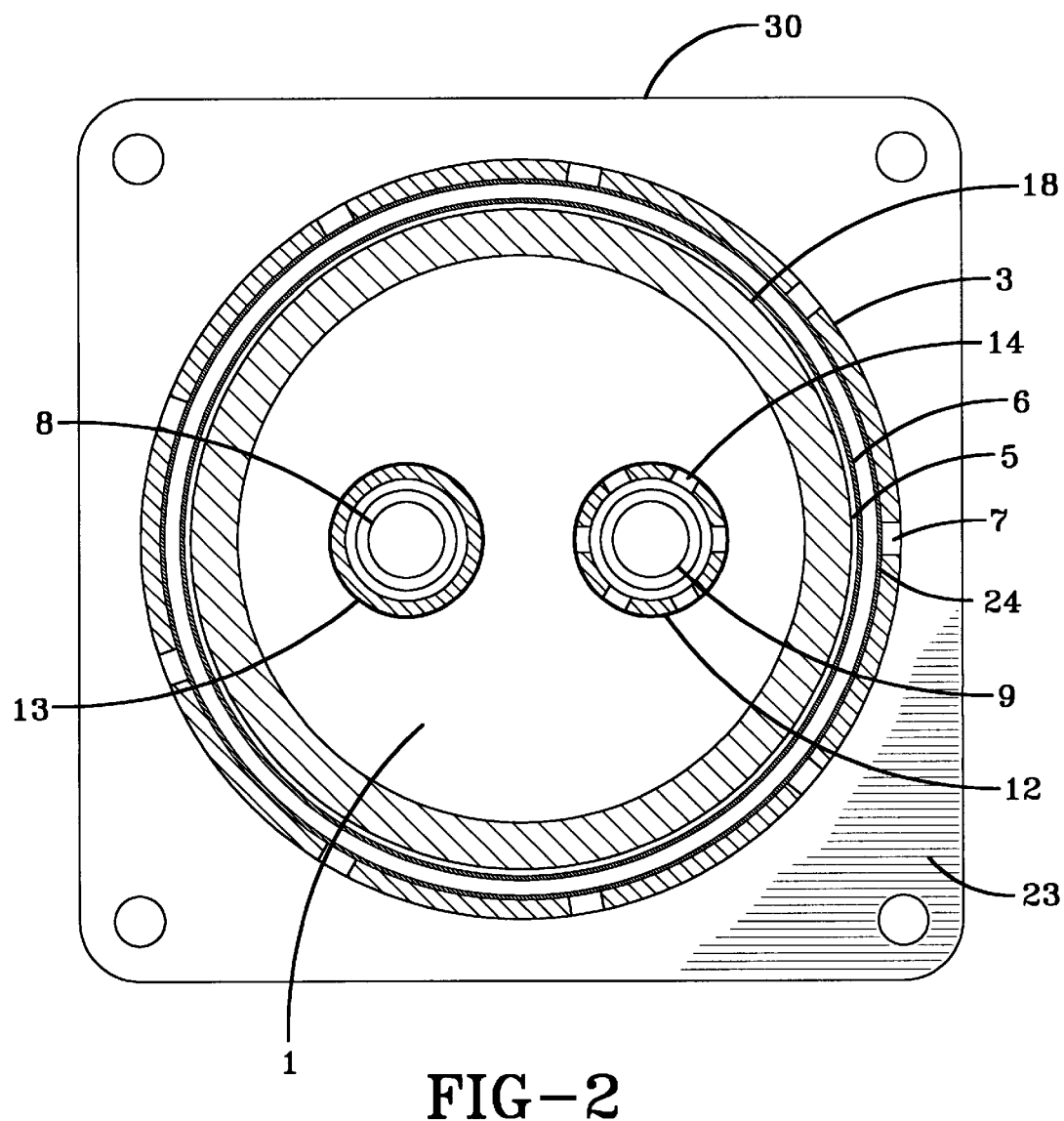
FIG. 2 is cross-sectional view of an inflator in accordance with the invention taken along line 2—2 of FIG. 1.

The inflator 30 has two chambers housing gas generant. A cup shaped upper housing 3 and a cup shaped lower housing 4 form the primary combustion chamber 1. Referring to FIGS. 1 and 2, the upper housing 3 contains a plurality of primary gas exit ports 7. The primary gas exit ports 7 may be, but are not limited to, a single diameter. A primary closure 24, such as a thin metallic foil 24 adhesively-bonded to the upper housing 3 or a plug over the port, serves as a hermetic seal. Two circular holes are located in the lower housing 4 to accept the two igniter retainers 11 and 25. The upper housing 3 and lower housing 4 are configured in such a manner as to be welded together. A flange 23 is attached to the upper housing 3 by welding or crimping, although it could also be attached or consolidated into the lower housing 4. The volume defined by the interior of the upper housing 3 and the lower housing 4 is separated into two chambers by a divider plate 5. The divider plate 5 is cup shaped and consists of a substantially circular end plate and an outer tubular wall containing a plurality of secondary gas exit ports 22. The secondary gas exit ports 22 are of circular holes through the divider plate 5 and may be, but are not limited to, a single diameter. The secondary gas exit ports 22 are closed by a secondary closure 6, such as thin metallic foil adhesively bonded over the gas exit ports. The secondary closure 6 prevents the gasses produced by combustion in the primary combustion chamber 1 from entering the secondary combustion chamber 2 during a low output deployment and subsequent ignition of the gas generant housed therein. The outer tubular wall of the divider plate 5 is joined to the lower housing 4 and is retained by a close fit with a retaining ring 32 positioned between the lower housing 4 and the divider plate 5.

The primary combustion chamber enhancer tube 12 and the secondary combustion chamber enhancer tube 13 are inserted into the substantially circular end plate of the divider plate 5 and retained in place by a press fit and/or weld. The primary enhancer tube 12 is positioned in such a manner as to place the primary enhancer tube exit ports 14 in the primary chamber 1. The secondary enhancer tube exit ports 15 are positioned in such a manner as to place the secondary enhancer ports 15 in the secondary combustion chamber 2. The primary enhancer tube 12 and the secondary enhancer tube 13 comprise a substantially circular end plate and an outer tubular wall with a plurality of enhancer ports 14 and 15. The enhancer ports 14 and 15 are circular and distributed circumferentially around the outer tubular walls of the enhancer tubes 12 and 13. The enhancer ports may be, but are not limited to, a single diameter. The primary combustion chamber igniter retainer 11 is welded into the lower housing 4 and protrudes into the open end of the primary enhancer tube 12. A press fit is utilized to insure a gas tight seal between the primary combustion chamber enhancer tube 12 and the primary combustion chamber igniter retainer 11. Similar assembly is required for the secondary combustion chamber enhancer tube 13 and the secondary combustion chamber igniter retainer 25. The primary enhancer 17 (not shown for reasons of clarity) housed inside the primary igniter tube 12 comprises of an ignition material in the form of powder, granules and/or pellets. A primary igniter means 9 ignites the primary enhancer 17 after receiving an electrical signal from the sensor diagnostic means 40. The secondary combustion chamber igniter retainer 25, secondary igniter 8, and the secondary enhancer 16 (not shown for reasons of clarity) are similar in design and function to their primary stage counterparts. The primary filter 18 cools and filters particulates from the gas stream prior to the gas leaving the inflator through the primary gas exit ports 7. The primary filter is held in place by primary filter seals 34 and 36. The secondary filter 19 performs a similar function in the secondary combustion chamber 2, and is held in place with secondary filter seals 38 and 39.

In operation the inflator functions after receiving an electric signal from sensor diagnostic means, which determines the type of airbag inflation required for optimal vehicle occupant protection depending on the severity of a crash and the occupant position and size. The airbag inflation will begin with the deployment of the low output mode of the inflator or only the primary stage. The low output mode or primary stage functions when the primary igniter means 9 receives an electric signal from the sensor diagnostic means 40. When the igniter means 9 receives the signal, and activation occurs, ignition of the primary enhancer 17 results. The burning primary enhancer 17 produces hot gas and particles, which are expelled from the primary enhancer tube 12 through the primary enhancer ports 14 and into the primary combustion chamber 1 igniting the primary gas generant, housed therein. Once the primary gas generant 1 is ignited, gas flows through the primary filter 18 and into a first gas collection plenum 20. When the pressure inside the primary combustion chamber 1 reaches a predetermined level the primary closure 24 ruptures allowing the gas to flow through the primary exhaust ports 7 and into the airbag. The secondary closure 6 prevents sympathetic ignition of secondary stage by preventing the hot gasses from entering the secondary combustion chamber 2 through secondary gas ports 22 and igniting gas generant housed therein.

The high output mode requires that both the primary 9 and secondary igniter means 8 are activated simultaneously by sensor diagnostic means 40. The primary combustion chamber 1 would function as described above. The secondary stage occurs when the gas generant housed in the secondary combustion chamber 2 has been ignited. Function of the second stage occurs in a manner similar to the primary stage. The secondary igniter means 8 ignites the secondary enhancer 16. The burning secondary enhancer 16 produces hot gas and hot particles which are expelled from the secondary enhancer tube 13 through the secondary enhancer ports 15 and into the secondary gas generant housed in the secondary combustion chamber 2. The secondary gas generant when ignited produces gas, which flows through the secondary filter 19 and into a second gas plenum 21. As the secondary combustion chamber 2 pressure increases the secondary closure 6 opens allowing the gas to flow through the secondary gas ports 22 and into the first gas collection plenum 20 and through the primary gas ports 7 into the airbag.

The secondary stage can be deployed simultaneously with the primary stage or the secondary stage may be delayed to some time later as determined by sensor diagnostic means 40. The function of each chamber or stage is the same in all cases. In the case of long interstage delays, the primary stage deployment may be completed prior to function of the secondary chamber. The secondary gas ports 22 are sized properly to provide for proper combustion of the secondary gas generant and minimal noxious effluents while limiting the gas output to an acceptable level.

In the event that the inflator 30 is exposed to fire or other sources of extreme heat the inflator 30 is designed to autoignite and function in the normal manner. An autoignition element 10 is placed in intimate thermal contact with the lower housing 4 in the secondary chamber 2. In the event of exposure to high temperatures the autoignition element 10 deploys igniting the secondary gas generant 2. The gasses produced by the gas generant flow through the secondary enhancer ports 15 and ignite the secondary enhancer 16 and secondary igniter 8. As the gasses enter the first plenum 20 they also pass through the primary filter 18 and ignite the primary gas generant 1, primary enhancer 17 and primary igniter 9.

It is to be understood that while the presently preferred embodiments of the present invention have been described, various changes and modifications may be made by those skilled in the art without departing from the scope of the invention as set forth in the claims.

What is claimed is:

1. An apparatus for inflating an airbag of a vehicle occupant safety restraint system comprising:
  a primary combustion chamber containing a first body of gas generating means, said primary chamber having a plurality of primary gas ports communicating said primary chamber with said airbag;
  a secondary combustion chamber located within the primary combustion chamber containing a second body of gas generating means;
  a divider plate separating the primary combustion chamber and the secondary combustion chamber, the divider plate having a plurality of secondary gas ports with a secondary closure, wherein the secondary gas ports connect the first and secondary combustion chambers;
  a primary igniter means for igniting the first body of gas generating means; a secondary igniter means for igniting the second body of gas generating means; and sensor diagnostic means connected to the primary and secondary igniter means, wherein the sensing means sends a signal to the primary and secondary igniter means to activate the primary and secondary igniter means as required
  a primary combustion chamber enhancer tube containing a primary enhancer, the primary enhancer tube having a plurality of primary enhancer ports positioned in the primary chamber, wherein the primary igniter means ignites the primary enhancer, which produces hot gas that is expelled through the primary enhancer ports igniting the first body of gas generating means; and
  a secondary combustion chamber enhancer tube containing a secondary enhancer, the secondary enhancer tube having a plurality of secondary enhancer ports positioned in the secondary chamber, wherein the secondary igniter means ignites the secondary enhancer, which produces hot gas that is expelled through the secondary enhancer ports igniting the second body of gas generating means.

2. The apparatus for inflating an airbag of a vehicle occupant safety restraint system of claim 1 further comprising a first gas plenum located between the primary chamber and the primary gas ports.

3. The apparatus for inflating an airbag of a vehicle occupant safety restraint system of claim 1 further comprising a second gas plenum located between the secondary chamber and the secondary gas ports.

4. The apparatus for inflating an airbag of a vehicle occupant safety restraint system of claim 1 further comprising a burst foil attached to the primary gas ports.

5. The apparatus for inflating an airbag of a vehicle occupant safety restraint system of claim 1 wherein the secondary closure is foil.

6. The apparatus of claim 1 further comprising:
  a primary filter located between the primary chamber and the primary gas ports; and
  a secondary filter located between the secondary chamber and the secondary gas ports.

7. The apparatus of claim 1 further comprising:
  a first gas collection plenum located between the primary chamber and the primary gas ports; and
  a second gas plenum located between the secondary chamber and the secondary gas ports.

8. An apparatus for inflating an airbag of a vehicle occupant safety restraint system comprising:
  a housing having an upper housing and a lower housing;
  a divider plate located between the upper housing and the lower housing for dividing the housing into a primary combustion chamber and a secondary combustion chamber, the divider plate having a plurality of secondary gas ports with a secondary closure, the secondary ports connecting the primary and secondary combustion chambers, the primary combustion chamber having a plurality of primary gas ports for communicating said primary chamber with said air bag, the primary chamber contains a first body of gas generating means and the secondary combustion chamber contains a second body of gas generating means;
  a primary combustion chamber enhancer tube containing a primary enhancer, the primary enhancer tube having a primary enhancer port positioned in the primary chamber;
  a secondary combustion chamber enhancer tube containing a secondary enhancer, the secondary enhancer tube having a secondary enhancer port positioned in the secondary chamber;
  a primary igniter means for igniting the primary enhancer, wherein the primary enhancer produces hot gas which is expelled through the primary enhancer ports igniting the first body of gas generating means;
  a secondary igniter means for igniting the secondary enhancer, wherein the secondary enhancer produces hot gas which is expelled through the secondary enhancer ports igniting the second body of gas generating means; and sensor diagnostic means connected to the primary and secondary igniter means, wherein the sensing means sends a signal to the primary and secondary igniter means to activate the primary and secondary igniter means as required.

9. The apparatus of claim 8 further comprising a burst foil attached to the primary gas ports.

10. The apparatus of claim 8 wherein the secondary closure is foil.

11. The apparatus of claim 8 wherein the divider plate is cup shaped.

12. The apparatus of claim 8 further comprising:

a primary filter located between the primary chamber and the primary gas ports; and a secondary filter located between the secondary chamber and the secondary gas ports.

13. The apparatus of claim 8 further comprising:

a first gas collection plenum located between the primary chamber and the primary gas ports, a second gas plenum located between the secondary chamber and the secondary gas ports.

\* \* \* \* \*